United States Patent [19]

Focke et al.

[11] Patent Number: 4,929,226
[45] Date of Patent: May 29, 1990

[54] PROCESS AND APPARATUS FOR PRODUCING AND CONVEYING PACK BLANKS

[75] Inventors: Heinz Focke; Kurt Liedtke, both of Verden, Fed. Rep. of Germany

[73] Assignee: Focke & Co. (GmbH & Co.), Verden, Fed. Rep. of Germany

[21] Appl. No.: 261,041

[22] Filed: Oct. 21, 1988

[30] Foreign Application Priority Data

Oct. 22, 1987 [DE] Fed. Rep. of Germany ....... 3735675

[51] Int. Cl.⁵ ............................................... B31B 1/16
[52] U.S. Cl. ...................................... 493/343; 493/62; 493/74; 493/362; 225/4; 225/100
[58] Field of Search ........................ 493/62, 64, 69, 79, 493/162, 343, 361, 362; 225/4, 100

[56] References Cited

U.S. PATENT DOCUMENTS

| | | | |
|---|---|---|---|
| 3,373,663 | 3/1968 | Heim | 493/164 |
| 3,658,220 | 4/1972 | Norton | 225/2 |
| 4,331,434 | 5/1982 | Buschor | 493/67 |
| 4,713,048 | 12/1987 | Reil et al. | 493/74 |
| 4,785,696 | 11/1988 | Martiny | 83/152 |

Primary Examiner—William Terrell
Attorney, Agent, or Firm—Sughrue, Mion, Zinn, Macpeak & Seas

[57] ABSTRACT

When blanks for producing (cigarette) packs are made in the region of the packaging machine itself, especially by being severed from a web of material (12), the blank production must be matched to the performance of the packaging machine. For severing blanks (10, 11) from a web of material (12) having stampings, perforations, etc. drawing rollers (25, 26) and conveying rollers (33, 34), on the one hand, and tearing rollers (27, 28 and 35, 36) running at a higher speed, on the other hand are used. The blanks (10, 11) are torn off as a result of the difference in the conveying speed. In the simultaneous processing of two blanks (10, 11), units (23) comprising two blanks (10, 11) are first servered from the web of material (12) and these are then divided into individual blanks (10, 11) which are conveyed further, especially fed to a folding turret (20).

11 Claims, 6 Drawing Sheets

PROCESS AND APPARATUS FOR PRODUCING AND CONVEYING PACK BLANKS

BACKGROUND OF THE INVENTION

The invention relates to a process for producing pack blanks by tearing off from a web of material with perforations or the like to define the blanks and for feeding them to conveying or folding unit, especially a folding turret, the blanks being torn off from the web of material in succession as a result of tensile force. The invention relates, furthermore, to an apparatus for producing and conveying pack blanks.

The invention is concerned with a special method of producing blanks in conjunction with a packaging machine and of feeding them to the folding and conveying units. The blanks in question consist of relatively thick or firm packaging material, especially thin cardboard, although they are supplied in the form of webbed material. Within the webs of material, the blanks are pre-stamped and connected to one another by means of perforations or other lines of weakness. For the processing of the blanks within the packaging machine, residual connections between the adjacent blanks are eliminated by tearing, so that individual blanks are then provided.

German Patent Application P 37 16 897.5 of 20th May 1987 (corresponding to U.S. patent application No. 07/184,640, filed Apr. 21, 1988) is concerned with a preferred sector of use of the above-described technique for the production of blanks. This relates to the formation and processing of blanks made of thin cardboard for hinge-lid (cigarette) packs. The relatively complex blanks are oriented with their longitudinal extension transverse relative to the longitudinal direction of the web of material and are connected to one another in selected regions by means of residual connections or perforations. For the processing of the blanks, these are torn off from the web of material in succession and fed to a folding turret or the like.

SUMMARY OF THE INVENTION

The invention deals with measures for an efficient production of the individual blanks by tearing off from the web of material, especially in conjunction with blanks according to the abovementioned Patent Application.

The object on which the invention is based is to develop further and improve a process and an apparatus of the type mentioned in the introduction, to the effect that the individual blanks can be produced especially efficiently within the packaging machine and further processed in a simple way.

To achieve this object, the process according to the invention is characterized in that the blanks, after being severed, can be fed to the folding turret or the like transversely relative to the conveying direction of the web of material.

The blanks are therefore conveyed along a conveying and blank track which is angled (as seen in horizontal projection). The blanks are torn off from the web of material in the conveying direction of the latter. Thereafter, the blanks are transferred to the folding turret in the transverse direction. The production and further transport of the blanks up to the folding turret are thereby possible by means of simple conveying members.

Special measures are taken when two or more blanks are processed simultaneously in order to increase the output. In this case, according to the invention, two or more blanks are severed from the web of material in a first tearing-off operation and conveyed further as a unit. This unit consisting of several blanks is then divided into the individual blanks by tearing.

The apparatus for producing blanks by tearing off and for transporting them further is characterized by a pair of drawing rollers for the (continuous) advance of the web of material, by a (first) pair of tearing rollers rotating at a higher circumferential speed and intended for tearing off at least one blank, and by an adjoining blank track for the severed blanks.

The apparatus for preparing two or more blanks to be processed simultaneously is designed in a special way. In this case, according to the invention, a unit of two or more blanks is torn off from the web of material by the first pair of drawing rollers and fed to a subsequent severing station with, on the one hand, conveying rollers and, on the other hand, a second pair of tearing rollers which rotates at an even higher circumferential speed, for tearing the unit apart into the individual blanks. At the same time, the second severing station or the second pair of tearing rollers is preferably arranged in the region of the blank track, so that, after the unit has been divided into the individual blanks, these can be discharged immediately thereafter in the transverse direction.

According to the invention, the tearing rollers are likewise designed in a special way. At least one (upper) tearing roller is designed so that it comes into engagement or contact with the web of material or the blanks during a predetermined phase only. During the remaining phase of a revolution, relative to the other tearing roller of the pair of tearing rollers a gap is formed which allows the web of material or the blanks to pass through between the tearing rollers, without a tensile force being exerted. Preferably, the respective tearing roller is equipped with a tearing segment which acts as an elevation in the radial direction and which comes in contact with the web of material or the blank during the phase of exertion of the tensile or tearing force.

Further features of the invention relate to the design of the tearing sets and to the members for the transport of the web of material and of the (individual) blanks.

An exemplary embodiment according to the invention is explained in detail below by means of the drawings. In these:

DETAILED DESCRIPTION OF A PREFERRED EMBODIMENT

Figure 1:
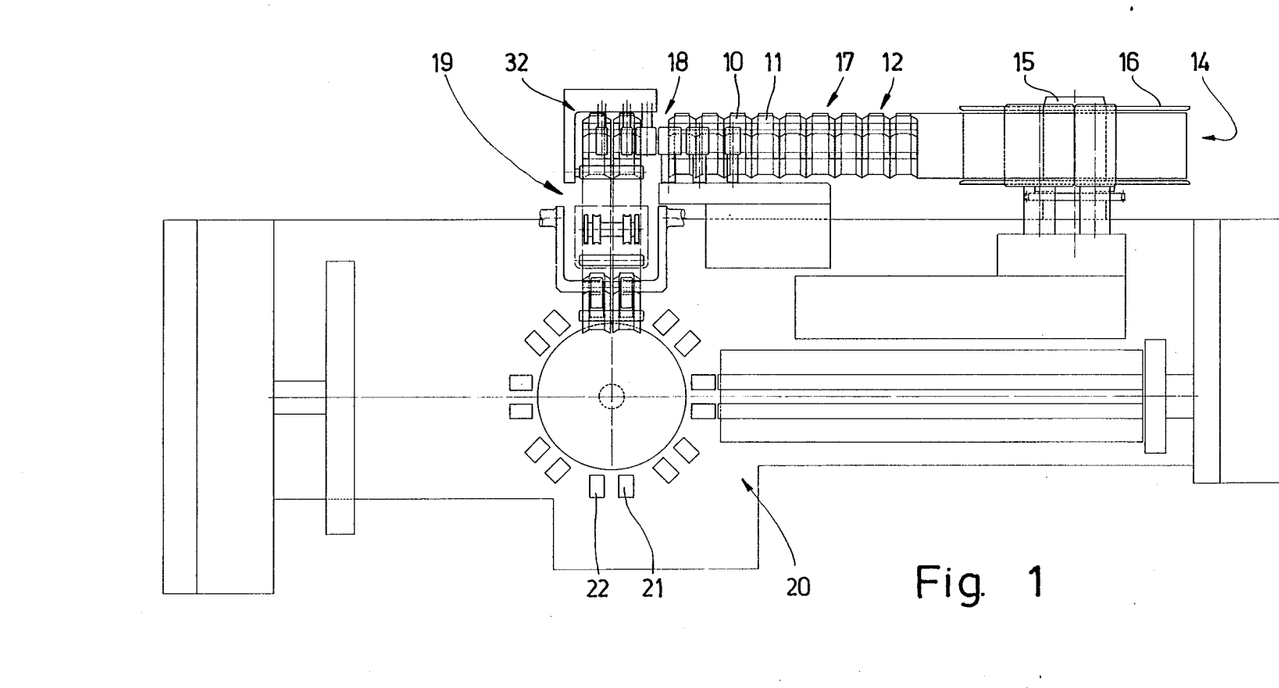
FIG. 1 shows a diagrammatic plan view of a packaging machine with devices for the production and handling of blanks.

The packaging machine shown diagrammatically in FIG. 1 serves for producing (cigarette) packs from thin cardboard, specifically hinge-lid packs. The particualr feature is that blanks 10, 11 for producing the hinge-lid pack are not fed to the packaging machine individually prefabricated, but as a web of material 12. This consists of performed blanks 10, 11 which are arranged in a continuous row next to one another and which are connected merely by means of residual connections 13 with the web of material 12. The blanks 10, 11 are oriented with their longitudinal extension transverse relative to the longitudinal direction of the web of material 12. Preferably, the blanks 10, 11 and the web of material 12 are designed according to German Patent Application P 37 16 897.5.

The web of material 12 is delivered as a wound reel 14 to the packaging machine. The latter is equipped on its rear side with a rearwardly directed supporting journal 15, onto which the reel 14 is slipped by means of a reel tube 16. The web of material 12 is drawn off from the reel 14 (continuously). A portion of the web of material 12 runs along a conveying track 17 at the rear of the packaging machine, approximately parallel to an (imaginary) longitudinal mid-plane of the latter.

In the region of a severing station 18, individual blanks 10, 11 are severed from the web of material 12, specifically by tearing. The individual blanks 10, 11 are then fed to a folding turret 20 along a blank track 19 transversely relative to the conveying track 17 and towards the front of the packaging machine. The blank track 19 terminates above one edge of the folding turret 20, in particular above pockets 21, 22 of the latter. The blanks 10, 11 are pressed into these from above.

In the present exemplary embodiment, the folding turret 20 is equipped with two respective pockets 21, 22 which are located parallel and next to one another and which are each fed simultaneously with a blank 10, 11. The output of the packaging machine is thereby doubled. Accordingly, two blanks 10, 11 at a time are severed from the web of material 12 and from one another and fed to the folding turret 20 in parallel along the blank track 19. The two blanks 10, 11 are introduced simultaneously into correspondingly arranged pockets 21, 22.

The procedure for severing the blanks 10, 11 from the web of material 12 is that, first, a unit 23 comprising two blanks 10, 11 still connected to one another is severed from the web of material 12, in particular torn off. The unit 23 is then conveyed to a distance from the web of material 12. The unit 23 is thereafter divided into the two individual blanks 10, 11.

The tearing off of the unit 23 and the severing of this take place as a result of differences in the conveying speed. For this purpose, various pairs of transport rollers and tearing rollers are combined with one another in a special way in the region of the severing station 18.

Figure 4:
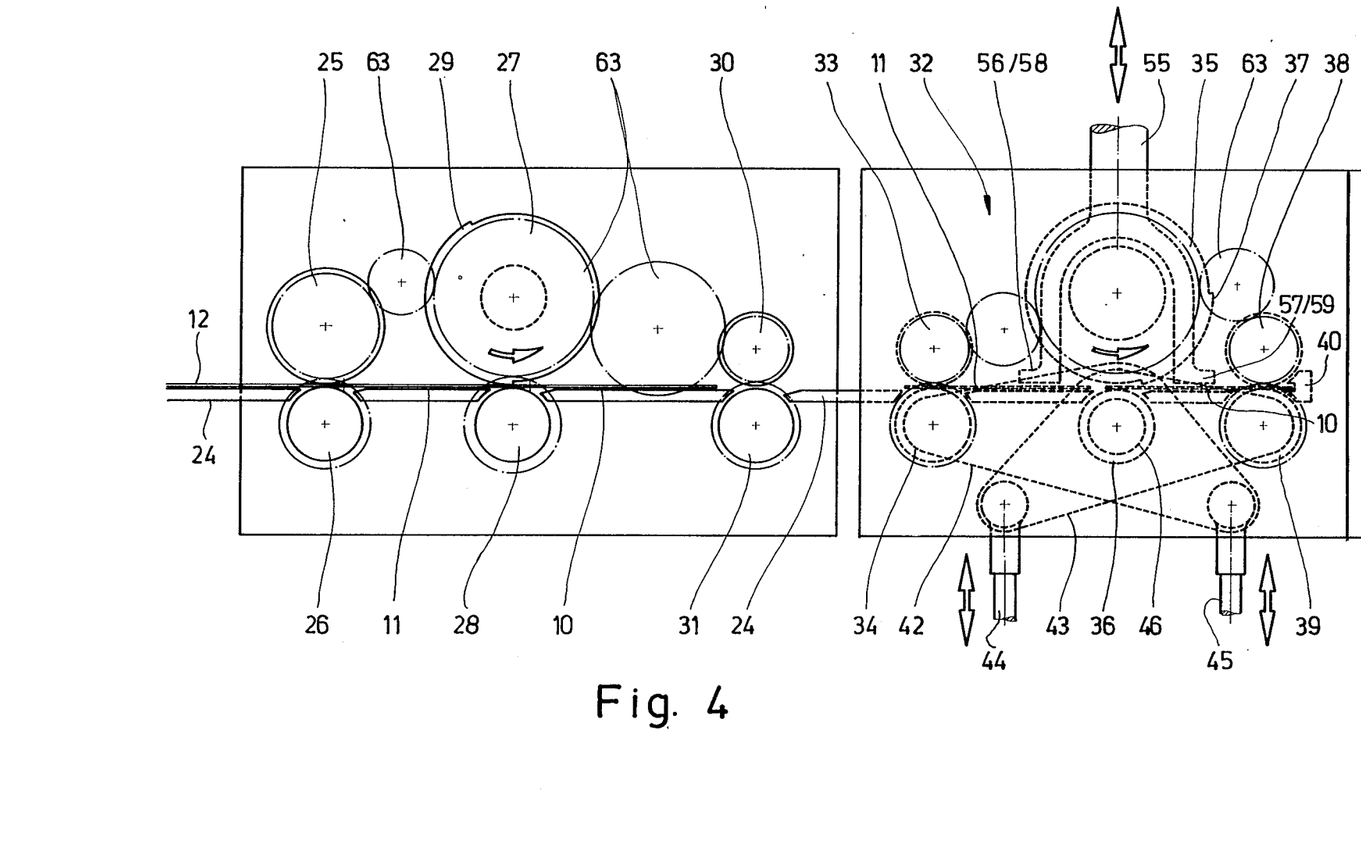
FIG. 4 shows a side view of members for producing individual blanks by tearing off (severing station)

According to FIG. 4, the web of material 12 is fed to a first severing set 66 of the severing station 18 by means of a first pair of drawing rollers 25, 26 on a transport base 24 forming the conveying track 17. The drawing rollers 25, 26 are driven (continuously) at a speed $V_0$.

At a distance matched to the size of the unit 23, the drawing rollers 25, 26 are followed by a pair of tearing rollers 27, 28. These are driven so that the circumferential surface conveying the web of material 12 or the unit 23 has a higher speed $V_1$ than the drawing rollers 25, 26. Since the web of material 12 is set at a speed $V_0$ by the drawing rollers 25, 26, the higher speed of the tearing rollers 27, 28, hen they grasp the web of material 12, causing a blank 10, 11 or the unit 23 to be torn off. In order to sever a unit 23, comprising two blanks 10, 11 still connected to one another, from the web of material 12, the distance between the drawing rollers 25, 26 and the tearing rollers 27, 28 is such that the web of material 12 is grasped by the tearing rollers 27, 28 only in the region of the blank 11 which is second in the conveying direction.

The tearing rollers 27, 28 are designed in a special way. The lower smaller tearing roller 28 serves merely as a mating roller, on the circumference of which the web of material 12 or the unit 23 rests constantly. The upper larger tearing roller 27 is designed along the circumference with a tearing segment 29. This tearing segment 29 projecting radially above the remaining circumferential surface of the tearing roller 27 transmits the tensile force necessary for the tearing operation to the web of material 12. During a revolution of the tearing roller 27, only the tearing segment 29 therefore rests (intermittently) against the web of material. During the remaining phase, in particular outside the tearing segment 29, a gap is formed between the tearing rollers 27 and 28, making it possible for the web of material 12 to advance without contact with the (upper) tearing roller 27.

The severed unit 23 is fed to a subsequent pair of conveying rollers 30, 31. These are arranged at such a distance from the tearing rollers 27, 28 that the unit 23 is grasped only after being severed by the tearing rollers 27, 28. The conveying rollers 30, 31 are driven at the same speed $V_1$ as the tearing rollers 27, 28. The dimensions of their tearing segment 29 are such that after the unit 23 has been severed, it is fed to the conveying rollers 30, 31. The conveying rollers 30, 31 thereafter take over the further transport of the unit 23.

Figure 2:
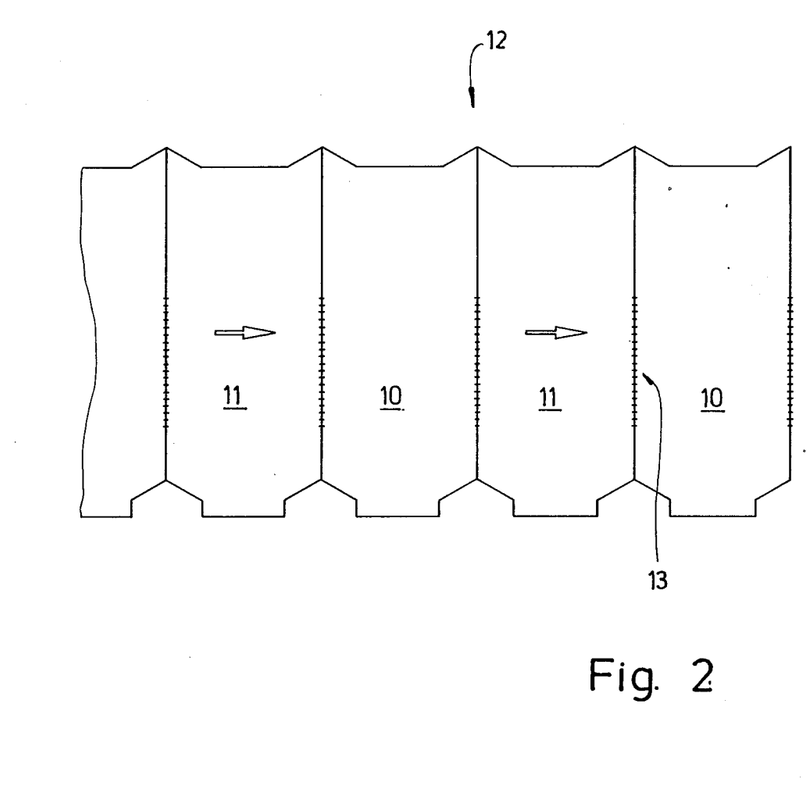
FIG. 2 shows a plan view of a portion of a web of material for blanks in the region of the production of the individual blanks.

As a result of the higher conveying speed of the tearing rollers 27, 28 and of the conveying rollers 30, 31 in relation to the drawing rollers 25, 26, the unit 23 after being severed, is conveyed very rapidly, a distance from the web of material 12 thereby being formed (FIG. 2).

The unit 23 now enters the region of a further severing station 32 for dividing the unit 23 into the individual blanks 10, 11. The severing station 32 receives the unit by means of two conveying rollers 33, 34. These feed the unit 23 to a pair of tearing rollers 35, 36. Whereas the conveying rollers 33, 34 are driven at the speed $V_1$ of the conveying rollers 30, 31, the tearing rollers 35, 36 have a comparatively higher speed $V_2$. Because of this, here too, the unit 23 is severed by tearing.

The tearing rollers 35, 36 are of the same design as the tearing rollers 27, 28. The lower tearing roller 36 is of unchanged position and relatively smaller diameter. The comparatively larger upper tearing roller 35 is equipped with a tearing segment 37 of the type described. The drive of the tearing roller 35 is such that the unit 23 can be conveyed through between the tearing rollers 35, 36 by the conveying rollers 33, 34. The tearing segment 37 grasps the unit 23 in the region of the leading blank 10 and severs this from the other blank 11 as a result of the higher speed. The severed blank 10 is then conveyed up to a lateral stop 40 by further conveying rollers 38, 39. The blank 10 thereby assumes a (short) distance 41 from the other blank 11. The two blanks 10, 11 are in the position for transport along the transversely directed blank track 19 to the pockets 21, 22.

Figure 3:
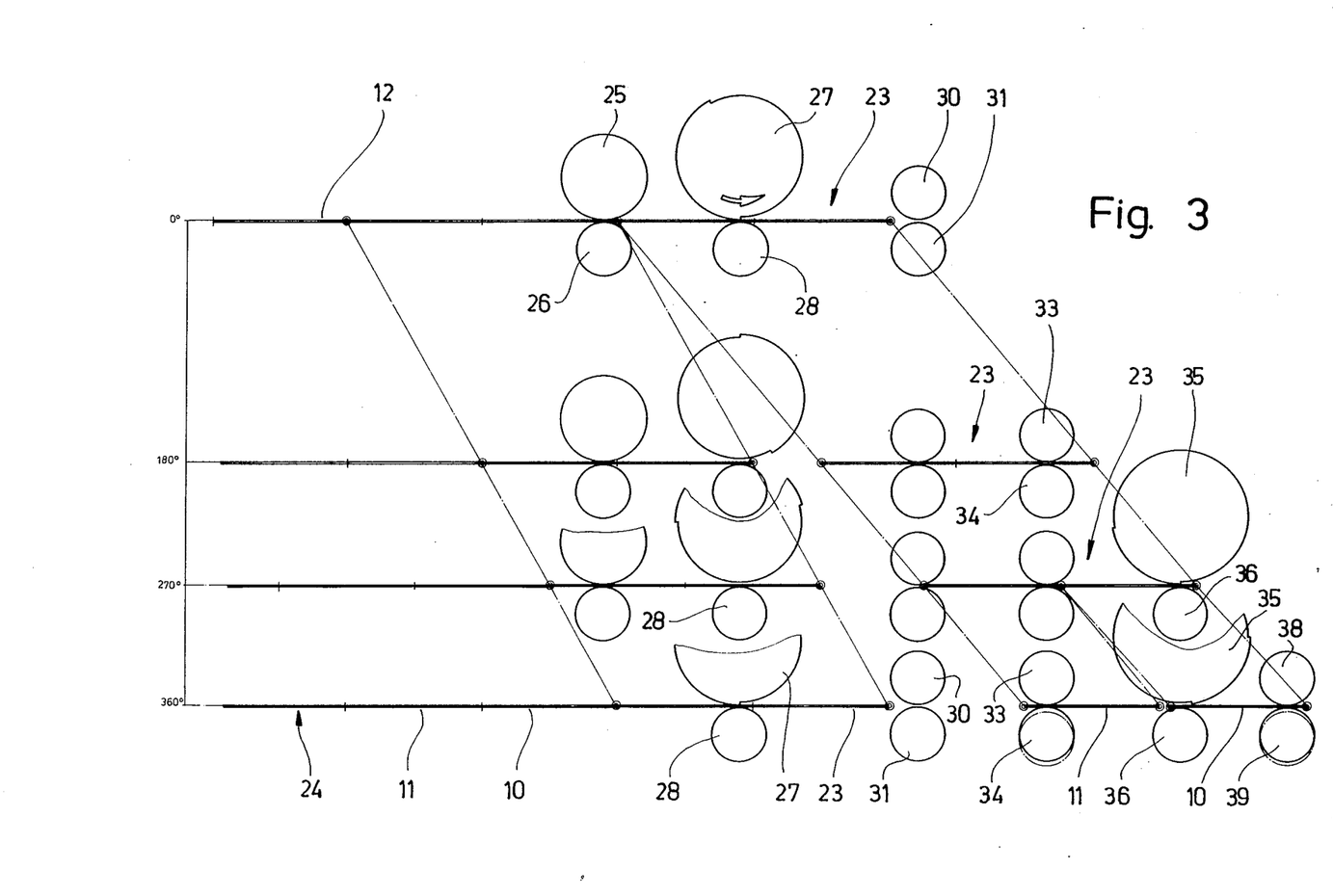
FIG. 3 shows a diagrammatic side view of the cycle of production of blanks by tearing off from a web of material.

The chronological flow of the process described is evident from the diagram according to FIG. 3. A work cycle of 360° C. starts at the moment when the web of material 12 is grasped by the tearing segment 29 of the tearing roller 27 for severing the unit 23. After 180° (half a work cycle), the unit 23 is already grasped by the severing set 32. The following web of material 12 remaining behind is conveyed into the position between the tearing rollers 27, 28.

After a further 90° (three-quarter of a work cycle), the unit 23 is conveyed into the region of the tearing rollers 35, 36 and is just grasped by the tearing segment 37. After the work cycle (360°) has ended, the two blanks 10, 11 severed from one another are in the position suitable for transport, held respectively by the lateral conveying rollers 33, 34 and 38, 39.

Figure 5:
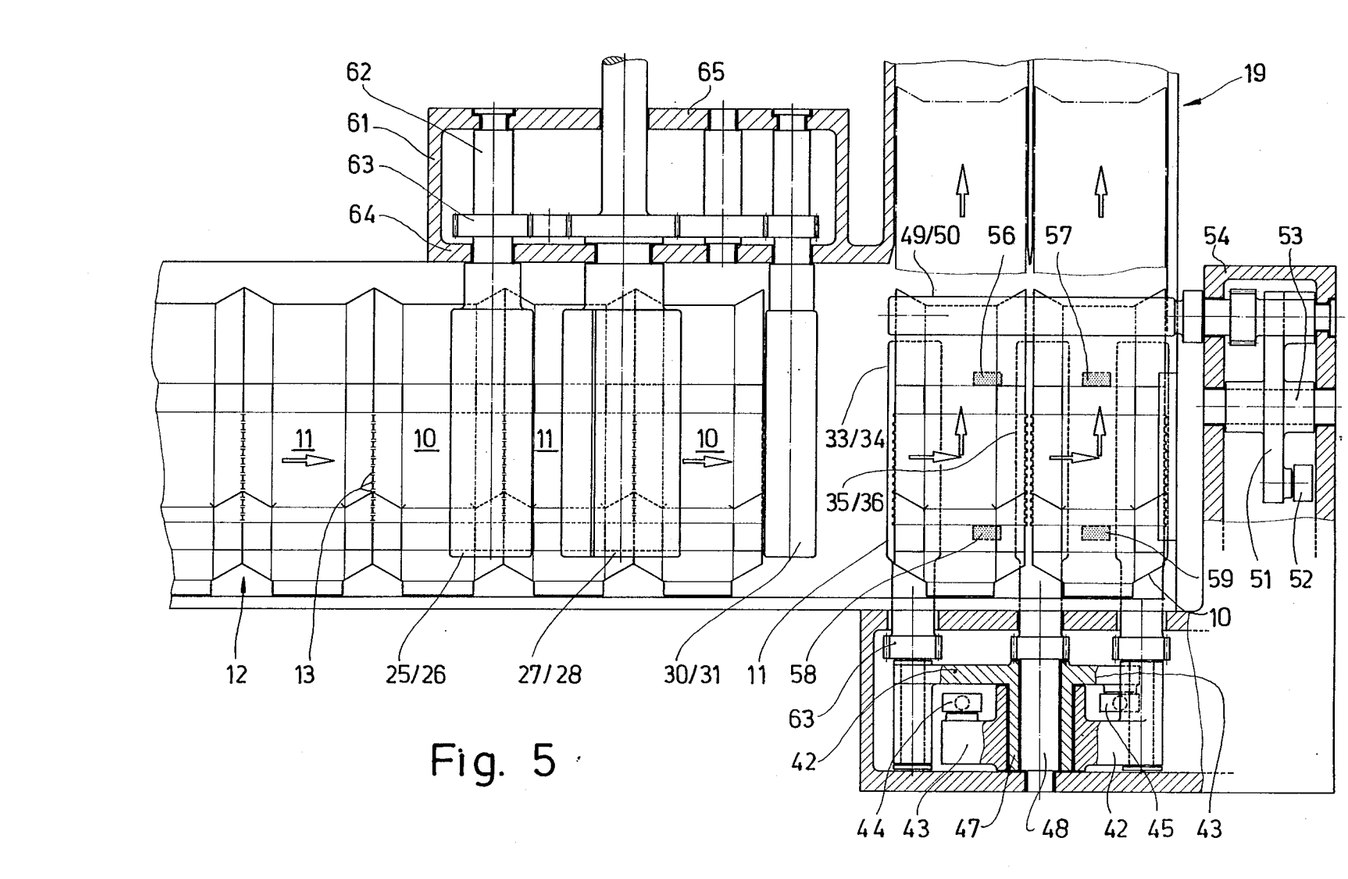
FIG. 5 shows a supplemented plan view of the severing station according to FIG. 4.

For discharging the blanks 10, 11 along the blank track 19, the conveying rollers 33, 34 and 38, 39 can be moved apart from one another. In the exemplary embodiment illustrated, for this purpose the respective lower conveying roller 34 or 39 is moved downwards, so that the blanks 10, 11 are freed. For this purpose, the conveying rollers 34, 39 are mounted on pivoting arms 42, 43 which are actuable by means of connecting rods 44, 45. The pivoting arms 42, 43 are movable about a common central pivot bearing 46 which is arranged concentrically relative to the axis of rotation of the lower tearing roller 36. As is evident from FIG. 5, the pivot bearing 46 is formed by a bearing sleeve 47 which is mounted rotatably on a drive shaft 48 for the tearing roller 36.

Here, the blanks 10, 11 are transported away along the blank track 19 by means of discharge rollers 49, 50. These are directed transversely relative the axis of the conveying rollers 33, 34 and 38, 39. The conveying rollers 33, 34 and 38, 39 mounted on one side so as to project and the tearing rollers 35, 36 are of such axial length that an edge region of the blanks 10, 11 which faces the blank track 19 remains free. The transversely directed discharge rollers 49, 50 take effect here, in particular on a part of the blanks which is at the front for transport in the region of the blank track 19. The discharge movement begins as soon as the conveying rollers 33, 34 and 38, 39 are lifted off from the blanks 10, 11, whilst at the same time the tearing segment 37 is disengaged.

Figure 6:
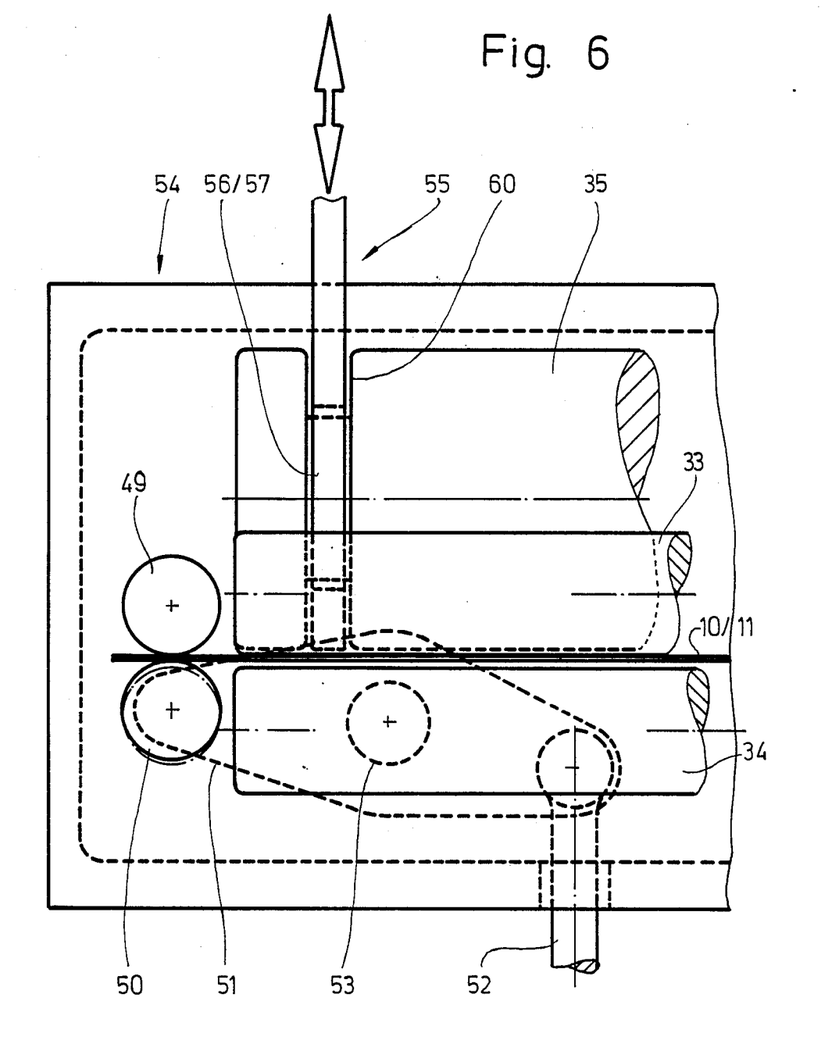
FIG. 6 shows a detail in the region of the severing station in a transverse view relative to that of FIG. 5 and on an enlarged scale.

The discharge rollers 49, 50 are also mounted so that they rest against the blanks 10, 11 only for transporting these away, but leave a gap free during the phase of feeding them. As is evident from FIG. 6, for this purpose the lower discharge roller 50 is mounted on a pivoting lever 51 which is actuable at the free end by means of a connecting rod 52. A pivot bearing 53 for the pivoting lever 51 is located outside the region of the conveying track 17 and of the blank track 19 in a separate transmission housing 54.

For the additional fixing of the blanks 10, 11 after they have been severed in the region of the severing set 32, there are two holding-down devices 55 which, by means of fork-shaped supporting arms 56, 57 and 58, 59 are lowered onto the blanks 10, 11 after severence, in such a way that each blank 10, 11 is pressed downwards onto the transport base 24 by two supporting arms 56, 59 located at a distance from one another. The holding-down devices 55 are raised again, as soon as the discharge of the blanks 10, 11 begins. As is evident from FIG. 6 the supporting arms 56, 59 are located on both sides of the (upper) tearing roller 35. This is equipped with an annular recess 60 in the region of each of the holding-down devices 55. These enter the recess 60, without thereby impairing the rotary movement of the tearing roller 35.

The drawing rollers 25, 26, the tearing rollers 27, 28 and the conveying rollers 30, 31 are mounted on one side so as to project freely, specifically in or on a common transmission housing 61. Drive shafts 62 are connected to one another in transmission terms by means of gear wheels 63. The free ends of the drive shafts 62 are mounted rotatably in a front housing wall 64 and a rear housing wall 65 and are therefore supported sufficiently.

The arrangement in the region of the conveying rollers 33, 34 and 38, 39 and of the tearing rollers 35, 36 is chosen in a similar way, the transmission housing 54 being made angular and extending up to the above-mentioned rollers.

What is claimed is:

1. In a process for producing pack blanks (10, 11) by tearing the blanks (10, 11) from a web of material conveyed in a conveying direction (12), said blanks being defined by perforations in the web which run only transversely relative to the conveying direction in the web of material (12), the improvement comprising the steps of:
   performing said tearing step by tearing off from the web of material (12) two of the blanks (10, 11), in succession in the conveying direction, as an attached unit (23);
   then, severing the unit (23) into two individual blanks (10, 11) by exerting tensile force only in the conveying direction; and then simultaneously feeding the two severed blanks (10, 11), transversely to the conveying direction of the web of material (12), to a folding unit (20).

2. Process, according to claim 1, comprising the step of, prior to tearing off into the two individual blanks (10, 11), further conveying the severed unit (23) to a position spaced downstream from the web of material (12).

3. In an apparatus for producing pack blanks (10, 11) by tearing off the blanks (10, 11) from a conveyed web of material (12), and feeding the blanks to a folding turret the blanks (10, 11) being defined by perforations that run only transversely to the conveying direction of the web of material (12); and wherein a conveying means conveys the web of material (12) along a conveying track (17) in the conveying direction;
   the improvement comprising:
   two successive severing station means (18, 32) respectively provided with a first pair and a second and second pair of tearing rollers (27, 28 or 35, 36) the respective pairs having different drive speeds, of which the first severing station means (18) tears from the web (12) a unit (23) consisting of two attached blanks (10, 11), and of which the second severing station means (32) tears each unit into individual blanks (10, 11) by pulling only in the conveying direction; said first pair of tearing rollers (27, 28) grasping the trailing blank (11) of the unit (23) to be severed and pulling it from the web, and said second pair of tearing rollers (35, 36) grasping the severed unit (23) in a region of the leading blank (10) and pulling it only in the conveying direction; and blank track means (19), running transversely relative to the conveying direction of the web of material (12), for feeding the severed blanks to the folding turret (10).

4. Apparatus, according to claim 3, characterized in that said first pair of tearing rollers (27, 28) is followed by a first pair of conveying rollers (30, 31) for further conveyance of the units (23), the first pair of conveying rollers (30, 31) being driven at the same speed as the first pair of tearing rollers (27, 28).

5. Apparatus, according to claim 4, characterized in that the second severing station means (32) consists, on an entry side, of a second pair of conveying rollers (33, 34) and, thereafter, of said second pair of tearing rollers (35, 36) driven at a higher speed than said second pair of conveying rollers (33, 34).

6. Apparatus, according to claim 3, characterized in that said first and second pairs of tearing rollers (27, 28; 35, 36) are equipped, on the circumferences thereof, with tearing segments (29, 37) that project radially and that grasp the web of material (12) and the unit (23), respectively, in order to exert a tensile force together with a mating roller; a gap for the passage of the web of material (12) and the unit (23), respectively, being formed between said first and second pairs of tearing rollers (27, 28; 35, 36) outside a region of the tearing segments (29, 37).

7. Apparatus, according to claim 5, comprising a stop (40), and characterized in that, of the blanks (10, 11) formed in said second severing station means (32), the leading blank (10) is conveyed against said stop (40) by said second pair of tearing rollers (35, 36) in such a manner that a distance (41), necessary for further conveyance within said blank track means (19), is formed between the two blanks (10, 11).

8. Apparatus, according to claim 3, comprising, at the end of said conveying track (17), a cross-conveyor for conveying the severed blanks (10, 11) into said blank track means (19) which is directed transversely relative to the conveying track (17), said cross-conveyor comprising a pair of discharge rollers (49, 50) with axes transverse relative to the axes of said second pair of conveying rollers (33, 34) and said second pair of tearing rollers (35, 36).

9. Apparatus, according to claim 3, comprising means for moving apart said first and second pairs of conveying rollers (33, 34 and 38, 39) from one another in a region of the second severing station means (32), and for discharging the blanks (10, 11) into said blank track means (19), as a result of a downward movement of respective ones of lower conveying rollers (34, 39) from respective ones of upper rollers of said first and second pairs of conveying rollers (33, 38).

10. Apparatus, according to claim 7, characterized in that the transversely directed discharge rollers (49, 50) grasp the blank or blanks (10, 11) in a region of a free front part, relative to the conveying direction, in said blank track means (19), and further comprising means for moving the blanks apart from one another for conveyance into said second severing station means (32).

11. Apparatus, according to claim 3, comprising fixing means for fixing the blanks (10, 11), after being severed, in position in a region of said second severing station means (32), and thus before entering said blank track means (19), said fixing means comprising at least one holding-down device (55) which is movable up and down and which has supporting arms (56, 57; 58, 59).

* * * * *